United States Patent
Fukuhara et al.

(10) Patent No.: US 12,278,054 B2
(45) Date of Patent: Apr. 15, 2025

(54) POWER STORAGE MATERIAL AND ULTRA POWER STORAGE BODY

(71) Applicants: TOHOKU UNIVERSITY, Sendai (JP); NIPPON PAPER INDUSTRIES CO., LTD., Tokyo (JP)

(72) Inventors: Mikio Fukuhara, Sendai (JP); Fumihiko Hasegawa, Sendai (JP); Tomoyuki Kuroda, Sendai (JP); Osamu Ito, Sendai (JP); Toshiyuki Hashida, Sendai (JP); Takeshi Nakatani, Tokyo (JP); Masahiro Morita, Tokyo (JP)

(73) Assignees: TOHOKU UNIVERSITY, Sendai (JP); NIPPON PAPER INDUSTRIES CO., LTD., Tokyo (JP)

( * ) Notice: Subject to any disclaimer, the term of this patent is extended or adjusted under 35 U.S.C. 154(b) by 315 days.

(21) Appl. No.: 17/800,156

(22) PCT Filed: Feb. 12, 2021

(86) PCT No.: PCT/JP2021/005353
§ 371 (c)(1),
(2) Date: Aug. 16, 2022

(87) PCT Pub. No.: WO2021/166813
PCT Pub. Date: Aug. 26, 2021

(65) Prior Publication Data
US 2023/0071958 A1    Mar. 9, 2023

(30) Foreign Application Priority Data
Feb. 18, 2020   (JP) .................................. 2020-025301

(51) Int. Cl.
*H01G 4/16* (2006.01)
*H01G 4/30* (2006.01)

(52) U.S. Cl.
CPC ................. *H01G 4/16* (2013.01); *H01G 4/30* (2013.01)

(58) Field of Classification Search
CPC .................................. H01G 4/30; H01G 4/16
See application file for complete search history.

(56) References Cited

U.S. PATENT DOCUMENTS

| | | | |
|---|---|---|---|
| 9,525,177 B2 | 12/2016 | Sturgeon et al. | |
| 2002/0181185 A1* | 12/2002 | Kabumoto | H01L 23/49822 |
| | | | 257/E23.079 |

(Continued)

FOREIGN PATENT DOCUMENTS

| JP | 2010-238808 A | 10/2010 |
|---|---|---|
| JP | 2012-253321 A | 12/2012 |

(Continued)

OTHER PUBLICATIONS

Sep. 6, 2023 Extended European Search Report issued in European Patent Application No. 21756308.9.

(Continued)

*Primary Examiner* — David M Sinclair
(74) *Attorney, Agent, or Firm* — Oliff PLC (57) ABSTRACT

A power storage material is made by using a fiber material of cellulose molecules obtained from wood, plant fibers (pulp), and the like, and capable of storing electric power of direct current and alternating current, and an ultra power storage body has the power storage material. A power storage material includes a fiber mainly including a fiber derived from at least any one of wood, plant fibers (pulp), animals, algae, microorganisms, and microbial products, and having a large number of recesses and protrusions on a surface. The fiber is preferably crystallized/amorphous fibers, is preferably an amorphous fiber having an atomic vacancy, and preferably has a specific surface area of 10 $m^2/g$ or more. Preferably, the large number of recesses and (Continued)

protrusions have a diameter of 1 nm to 500 nm. Preferably, the electric resistance is 100 MΩ or more, and the electric capacity is 5 mF/cm² or more.

13 Claims, 4 Drawing Sheets

(56) References Cited

U.S. PATENT DOCUMENTS

| | | | |
|---|---|---|---|
| 2015/0014039 A1 | 1/2015 | Nogi et al. | |
| 2019/0206632 A1* | 7/2019 | Zhamu | H01G 11/86 |
| 2021/0332240 A1* | 10/2021 | Nakai | C08J 5/045 |

FOREIGN PATENT DOCUMENTS

| | | | | |
|---|---|---|---|---|
| JP | 2013251236 A | * | 12/2013 | |
| JP | 2015-000977 A | | 1/2015 | |
| JP | 2015-18696 A | | 1/2015 | |
| JP | 2015-57808 A | | 3/2015 | |
| JP | 2016017161 A | * | 2/2016 | |
| JP | 2016-134934 A | | 7/2016 | |
| JP | 2017-41578 A | | 2/2017 | |
| JP | 2018024967 A | * | 2/2018 | B82Y 30/00 |
| JP | 6498945 B2 | | 4/2019 | |
| JP | 6628241 B2 | | 1/2020 | |

OTHER PUBLICATIONS

May 11, 2021 International Search Report issued in International Patent Application No. PCT/JP2021/005353.
May 11, 2021 Written Opinion issued in International Patent Application No. PCT/JP2021/005353.
Mikio Fukuhara et al. "Electric Storage in De-Alloyed Si—Al Alloy Ribbons". European Physics Letters, 2012, vol. 99, pp. 47001-p. 1-47001-p. 5.
M. Fukuhara. "Electric Charging/Discharging Characteristics of Capacitor, Using De-Alloyed Si—20Al Alloy Ribbons". Electrical and Electronic Engineering, 2013, vol. 3, No. 2, pp. 72-76.
M. Fukuhara et al. "AC Charging/Discharging of De-Alloyed Si—Al—V Alloy Ribbons". Journal of Alloys and Compounds, 2014, vol. 586, pp. S130-S133.
M. Fukuhara et al. "Superior Electric Storage in De-Alloyed and Anodic Oxidized Ti—Ni—Si Glassy Alloy Ribbons". Phys. Status Sol. Rapid Research Letters, 2013, vol. 7, No. 7, pp. 477-480.
Mikio Fukuhara et al. "Electric Charging/Discharging Characteristics of Super Capacitor, Using De-Alloying and Anodic Oxidized Ti—Ni—Si Amorphous Alloy Ribbons". Nanoscale Research Letters, 2014, vol. 9, 253, 6 pages.
M. Fukuhara et al. "Anodic Oxidization of Ti—Ni—Si Amorphous Alloy Ribbons and Their Capacitive and Resistive Properties". Thin Solid Films, 2015, vol. 595, pp. 1-4.
Mikio Fukuhara et al. "Amorphous Titanium-Oxide Supercapacitors". Scientific Reports, 2016, vol. 6, 35870, 5 pages.
Mikio Fukuhara et al. "Superior Electric Storage on an Amorphous Perfluorinated Polymer Surface". Scientific Reports, 2016, vol. 6, 22012, 5 pages.
Mikio Fukuhara et al. "Amorphous Aluminum-Oxide Supercapacitors". European Physics Letters, 2018, vol. 123, pp. 58004-p. 1-58004-p. 5.
M. Fukuhara et al. "Amorphous Titanium-Oxide Supercapacitors With High Capacitance". European Physics Letters, 2019, vol. 128, pp. 58001-p. 1-58001-p. 5.
Micronics Japan Co., Ltd. "Secondary Battery Battenice". <URL: http://www.mjc.co.jp/product/index3.html>.
Complete Japanese Encyclopedia (Encyclopedia Nipponica). "Paper Capacitor". Shogakukan Inc., 2001.
Aug. 5, 2021 Office Action issued in Japanese Patent Application No. 2021-535129.
Nov. 26, 2021 Office Action issued in Japanese Patent Application No. 2021-535129.
Dec. 6, 2023 Office Action issued in Canadian Patent Application No. 3166059.
Bernd J. Neudecker et al.; "Power Fibers: Thin-Film Batteries on Fiber Substrates"; DTIC; ITN Energy Systems Inc., Littleton, CO; 2003; pp. 1-9.

* cited by examiner

POWER STORAGE MATERIAL AND ULTRA POWER STORAGE BODY

FIELD OF THE INVENTION

The present invention relates to a power storage material and an ultra power storage body.

DESCRIPTION OF RELATED ART

A capacitor is originally an electronic component that stores or discharges electric charge (electrical energy) by electrostatic capacity, and plays a role in mobile electronic equipment such as personal computers and mobile phones for power supply stability, backup circuits, coupling elements, noise filters, and the like, and is essential for electronic equipment. In recent years, high-performance IT products such as mobile phones and ultra-small storage devices and batteries for electric vehicles have rapidly evolved. Therefore, there is an increasing demand for capacitors having an even smaller size, larger capacity, and higher functionality such as a memory function. In particular, there is a demand for products suitable for a smart grid (next generation transmission network) society compatible with green innovation (low carbonization) to prevent global warming. For example, the market for capacitors such as automobiles, IT equipment, and energy-saving inverters is expanding steadily at an average annual rate of about 3.7%, reaching a trillion yen market.

As such a capacitor, a capacitor that does not use a combustible element such as lithium or an environmental pollutant is desirable. In other words, materials that are solid rather than liquid, harmless to health, and inexpensive are in demand.

Capacitors are broadly classified into those for high-voltage power circuits (heavy electricity) and those for electronic and electrical equipment circuits (light electricity) according to their applications. Among these capacitors, ceramic capacitors are mainly used as capacitors for electronic and electric equipment circuits in the weak electric classification, and secondary batteries are also used for power storage of mobile phones, and the like. On the other hand, capacitors for the heavy electric classification have not yet been put into practical use because of insufficient withstand voltage and storage capacity.

A capacitor using a conventional electric lumped constant circuit is widely used as a main component of electronic and electric equipment in a wide range from 1 pF to several tens of mF. Since storage capacity C (F) is represented by:

$$C = Q/V = \varepsilon \times (A/d)$$

(wherein Q is an electric charge, V is a voltage, $\varepsilon$ is a dielectric constant, A is an electrode area, and d is a distance between electrodes), as the electrode area is larger and the distance between electrodes is smaller, higher electric charge capacity is obtained. However, from the viewpoint of reduction in weight, thickness, and size of electronic and electric equipment and required storage capacity, it is difficult to increase the electrode area A, reduce the distance between electrodes d to obtain a maximum capacity, or it is difficult to reduce the electrode area A and to increase the distance between electrodes d to obtain a minimum capacity. Furthermore, in capacitors having dielectric body specification by the present electric lumped constant circuits, an electrostatic capacity is already saturated.

Examples of power storage methods that surpass conventional electric capacity include a method by an electric distributed constant circuit. For example, in recent years, an electric double-layer capacitor in which an electrolytic solution is filled in activated carbon has been put into a practical use. However, a solid electric double-layer capacitor has not been used yet.

Regarding solid power storage materials, the present inventors have discovered that charges can be accumulated regardless of whether electric charge is DC or AC in Si—(Al, Ti, V) alloys in which Al, Ti, and V are removed by surface extraction, $TiO_2$-coated Ti—Ni—Si alloys, and $Al_2O_3$-coated Al—Y amorphous alloys (see, for example, Non-Patent Literatures 1 to 7 and Patent Literatures 1 to 4).

Furthermore, the present inventors have developed a material in which nano-size recesses and protrusions are formed on the surface of amorphous titania, amorphous alumina or amorphous fluoropolymer as a power storage material utilizing a phenomenon in which when a compound particle becomes 40 nm or less and preferably 10 nm or less, a "quantum size effect" occurs due to electron shielding occurring on a nano-size solid surface (see, for example, Non-Patent Literatures 4, 7 to 9, and Patent Literature 4). In these power storage materials, as the diameter of protrusion becomes smaller in nano-size by the quantum nano-size effect, van der Waals electrostatic force works at minus 6 power of the diameter of the protrusion, and the electron adsorption ability with respect to the protrusion increases (see, for example, Non-Patent Literature 7). The work function, which is a standard of the electron adsorption ability, is 5.5 eV (see, for example, Non-Patent Literature 7) for amorphous titania and 10.3 eV to 13.35 eV (see, for example, Non-Patent Literature 4 and Patent Literature 4) for amorphous fluoropolymer.

In addition, as a material having larger work function than that of these power storage materials and being capable of storing large capacity, the present inventors have developed a power storage material having an amorphous surface mainly consisting of $AlO_6$ and a plurality of recesses and protrusions having a diameter of 0.1 to 50 nm, and a difference in height of 0.1 to 50 nm (see, for example, Non-Patent Literature 9).

Furthermore, as the power storage material, a physical secondary battery having a voltage of 1.5 V, electric power of 500 Wh/L, a power density of 8 kW/L, a battery life of 100000 cycles, and an operation temperature range of −25° C. to +85° C. has been developed (see, for example, Non-Patent Literature 11), but it uses a Schottky junction in which an electron capture level is formed in the band gap of a semiconductor and charge/discharge is performed by filling or emptying the potential in this level, and the voltage is limited to 1.5 V.

All of the above capacitors are artificial compounds of inorganic compounds or organic compounds. At present, production of artificial compounds that increase carbon dioxide and production of microplastics that cause marine pollution are being shunned around the world from the viewpoint of protecting plants and animals, and environmental preservation. From this point of view, development of biomass capacitors using wood, plant fiber (cellulose), obtained from plants, and the like, having low environmental impact in terms of production and disposal, and having light weight and high elastic performance, is a trend for global environmental conservation in accordance with the times.

At present, capacitor paper having a thickness of 8 to 15 micrometers, coated with a thin layer of lacquer, vacuum evaporated metals such as nickel, aluminum, and zinc, rolled in two layers, and impregnated with an impregnation agent are commercially available as capacitive paper capacitors with 100 picofarads to 10 microfarads. However, this uses vegetable oil and silicon oil as impregnation agents and uses a wet electric lumped constant circuit (see, for example, Non-Patent Literature 12).

CITATION LIST

Non-Patent Literatures

Non-Patent Literature 1: M. Fukuhara, T. Araki, K. Nagayama and H. Sakuraba, "Electric storage in de-alloyed Si—Al alloy ribbons", EuroPhys. Lett., 2012, 99, 47001

Non-Patent Literature 2: M. Fukuhara, "Electric Charging/Discharging Characteristics of Capacitor, Using De-alloyed Si-20Al Alloy Ribbons", Elect. Electr. Eng., 2013, 3(2), p. 72-76

Non-Patent Literature 3: M. Fukuhara and H. Yoshida, "AC charging/discharging of de-alloyed Si—Al—V alloy ribbons", J. Alloys and Comp., 2014, 586, S130-S133

Non-Patent Literature 4: M. Fukuhara, H. Yoshida, M. Sato, K. Sugawara, T. Takeuchi, I. Seki, and T. Sueyoshi, "Superior electric storage in de-alloyed and anodic oxidized Ti—Ni—Si glassy alloy ribbons", Phys. Stat. Sol. RRL, 2013, 7(7), p. 477-480

Non-Patent Literature 5: M. Fukuhara and K. Sugawara, "Electric charging/discharging characteristics of super capacitor, using de-alloying and anodic oxidized Ti—Ni—Si amorphous alloy ribbons", Nanoscale. Res. Lett., 2014, 9, p. 253

Non-Patent Literature 6: M. Fukuhara and K. Sugawara, "Anodic oxidization of Ti—Ni—Si amorphous alloy ribbons and their capacitive and resistive properties", Thin Solid Films, 2015, 595, p. 1-4

Non-Patent Literature 7: M. Fukuhara, T. Kuroda and F. Hasegawa, "Amorphous titanium-oxide supercapacitors", Sci. Rep., 2016, 6, 35870

Non-Patent Literature 8: M. Fukuhara, T. Kuroda, F. Hasegawa and T. Sueyoshi, "Superior electric storage on an amorphous perfluorinated polymer surface," Sci. Rep., 2016, 6, 22012

Non-Patent Literature 9: M. Fukuhara, T. Kuroda, F. Hasegawa, T. Hashida, E. Kwon and K. Konno, "Amorphous aluminum-oxide supercapacitors," EuroPhys. Lett., 2018, 123, 58004

Non-Patent Literature 10: M. Fukuhara, T. Kuroda, F. Hasegawa, Y. Shirai, T. Suwa, T. Hashida, and M. Nishijima, "Amorphous titanium-oxide supercapacitors with high capacitance", EuroPhys. Lett., 2019, 128, 58001

Non-Patent Literature 11: MICRONICS JAPAN CO., LTD., Secondary battery battenice, http://www.mjc.co.jp/product/index3.html Non-Patent Literature 12: Complete Japanese Encyclopedia (Encyclopedia Nipponica), "Paper Capacitor", SHOGAKUKAN Inc., 1994, Vol. 26

Patent Literatures

Patent Literature 1: JP No. 6498945
Patent Literature 2: JP No. 6628241
Patent Literature 3: JP-A-2016-134934
Patent Literature 4: JP-A-2017-41578

SUMMARY OF THE INVENTION

A power storage material described in Non-Patent Literature 7 is amorphous titania, a power storage material described in Non-Patent Literature 9 is amorphous alumina, and a power storage material described in Non-Patent Literature 8 is an amorphous polymer. These materials have recesses and protrusions of an electrical insulating product on the surface thereof, but all of them are an artificial product.

In view of these problems, the present invention has been made by focusing on use of plant fibers and the like being recyclable and friendly to the global environment, and has an object to provide a power storage material including a fiber material of cellulose molecules obtained from wood, plant fibers (pulp), and the like, capable of storing electric power in direct current and alternating current, and an ultra power storage body.

The present inventors have found that when a material such as a cellulose fiber or pulp that is an aggregate of cellulose fibers, having nano-recesses and nano-protrusions on a surface, is used as a solid power storage material, high power-storage properties are expressed, have focused on crystallized/amorphous fibers mainly including wood, plant fibers (pulp), and the like, and have completed the present invention. For example, the present inventors found that when a crystallized/amorphous fiber produced by a TEMPO catalytic oxidation method, a carboxymethylation (CM) method, and the like, and having a diameter of 1 to 30 nm is used, the quantum size effect causes the appearance of a surface that has a high storage property. In other words, as in the former case of amorphous titania, alumina, and polymers, this means that nanometer-sized recess and protrusion surfaces are formed on the crystallized/amorphous fibers and an aggregate of the fibers. In addition, in the electric power storage, since the electric circuit is a distributed constant circuit, the electric power storage device can be a large-capacity electric power storage device by parallel integration. In other words, the power storage amount is multiplied in proportion to the area as shown by the mathematical formula (1). The total power storage amount C is a multiplication of n nano-size capacitors c. Cellulose polymerized with β-glucose tends to be formed in a sheet form by hydrogen bonding, and is therefore suitable for integration of a nanocapacitor serving as a basis of electric distributed constant circuits.

[Math. 1]

$$C=\Sigma_{k=1}^{n}C_{k}=nc \tag{1}$$

Furthermore, the present inventors have noted that the polysaccharide cellulose represented by the molecular formula $(C_6H_{10}O_5)_n$ has an OH group. The present inventors considered that the OH group has a positive dipole moment in which a positive charge is stored, and even if the amount of adsorbed charge on the surface is increased, the positive charge maintains electroneutrality, so that dielectric breakdown is avoided. The present inventors also found that substitution of Na for H in the terminal carboxyl group COOH of the above molecular formula improves power storage.

In other words, the power storage material according to the present invention includes a fiber mainly including a fiber derived from at least any one of wood, plant fibers (pulp), animals, algae, microorganisms, and microbial products, and having a large number of recesses and protrusions on a surface thereof. Herein, the term "including a fiber substantially mainly including wood, plant fibers (pulp), and the like" refers to a fiber containing a first component originating from cellulose fibers contained in wood, plant fiber, and the like, in a maximum mass ratio.

In the power storage material according to the present invention, the fiber is preferably a crystallized/amorphous fiber. In particular, the crystallized/amorphous fibers are arranged in a sheet form. Furthermore, the fiber may be an amorphous fiber having an atomic vacancy. Furthermore, the large number of recesses and protrusions have a diameter of 1 nm to 500 nm.

The power storage material according to the present invention can store and discharge power by using a physical electron adsorption phenomenon by a quantum size effect generated in a protrusion in a plurality of recesses and protrusions. The power storage material according to the present invention is a capacitor in which innumerable recess and protrusion surfaces are made of a solid/gas electric double layer, and a plurality of capacitors are connected in a finite parallel manner to form an electric distributed constant circuit. Thus, the power storage material according to the present invention can store electric power instantaneously or in a relatively short time, and can store electric power in a large capacity.

In the power storage material according to the present invention, the crystallized/amorphous fiber material is not particularly limited as long as minute recesses and protrusions can be formed on a surface of a base material. Examples of the crystallized/amorphous fiber material include cellulose fibers, chitin fibers, collagen fibers, and the like. Pulp or cellulose nanofiber (hereinafter sometimes referred to as "CNF") is preferably used as the cellulose fiber. Nano-size CNF can enhance the electron adsorption ability by the quantum size effect of the minus 6 power law, and can further increase the storage capacity by increasing the work function. Since pulp is made of CNF, a large number of recesses and protrusions on the pulp surface at the nano-level originally exist, and pulp may be used as it is for handling and process convenience.

[Cellulose Fiber]

In the power storage material according to the present invention, types of cellulose fibers are not particularly limited, and, for example, it is possible to use cellulose derived from plants (for example, wood, bamboo, hemp, jute, kenaf, farm waste, cloth, pulp (unbleached soft wood kraft pulp (NUKP), bleached soft wood kraft pulp (NBKP), unbleached hard wood kraft pulp (LUKP), bleached hard wood kraft pulp (LBKP), unbleached soft wood sulfite pulp (NUSP), bleached soft wood sulfite pulp (NBSP), thermomechanical pulp (TMP), recycled pulp, waste paper, and the like), animals (for example, *Ascidiacea*), algae, microorganisms (for example, acetic acid bacteria (*Acetobacter*)), and microbial products. Cellulose fibers derived from plants or microorganisms are preferable, and cellulose fibers derived from plants are more preferable.

The number average fiber diameter of the cellulose raw material is not particularly limited. In the case of soft wood kraft pulp as a common pulp, the thickness is about 30 to 60 µm, and in the case of hard wood kraft pulp, the thickness is about 10 to 30 µm. In the case of other pulps, those that have undergone general purification are about 50 µm. For example, in the case of a purified chip of several centimeters in size, it is preferable to be adjusted to the thickness of about 50 µm by performing mechanical treatment with a disintegrator such as a refiner and a beater.

[Cellulose Nanofiber]

In the power storage material according to the present invention, cellulose nanofibers may be non-modified or may be chemically modified. Examples of the chemically modified cellulose nanofiber (chemically modified CNF) include an anion-modified CNF, a cation-modified CNF, and the like, but the anion-modified CNF is preferable. The anion-modified CNF is a fine fiber obtained by disintegrating an anionically-modified cellulose fiber in which an anionic group is introduced into a cellulose molecular chain, to a fiber of a nanoscale diameter.

Examples of the anionically-modified cellulose fibers include carboxylated (oxidized) cellulose fibers, carboxymethylated cellulose fibers, phosphate-esterified cellulose fibers, and phosphite esterified cellulose fibers. By disintegrating the above fibers, oxidized cellulose nanofibers, carboxymethylated cellulose nanofibers, phosphate-esterified cellulose nanofibers, and phosphite-esterified cellulose nanofibers are obtained. Among them, carboxylated (oxidized) cellulose nanofibers and carboxymethylated cellulose nanofibers are preferable.

In this specification, "CNF" refers to a fine fiber having a fiber diameter of about 1 to 500 nm, obtained by miniaturizing cellulose raw material such as pulp to the nanometer level. The average fiber diameter and average fiber length of cellulose nanofibers can be obtained by averaging the fiber diameter and fiber length obtained from the result of observation of each fiber using an atomic force microscope (AFM) or a transmission electron microscope (TEM). Cellulose nanofibers can be obtained by applying mechanical force to pulps to refine them, or by disintegrating anionically-modified cellulose fibers such as carboxylated cellulose fibers (hereinafter, also referred to as "oxidized cellulose fiber"), carboxymethylated cellulose fibers, phosphoric esterified cellulose fibers, and phosphorous esterified cellulose fibers. The average fiber length and average fiber diameter of the fine fibers can be adjusted by oxidation treatment and disintegrating treatment.

The average aspect ratio of the cellulose nanofibers is usually 50 or more. The upper limit is not particularly limited, but is usually 1000 or less. The average aspect ratio can be calculated by the following formula.

$$\text{Aspect ratio} = \text{Average fiber length}/\text{Average fiber diameter}$$

Types of the cellulose as raw materials for anion-modified CNF (hereinafter, also referred to as "cellulose raw material") not particularly limited, and, for example, it is possible to use cellulose derived from plants (for example, wood, bamboo, hemp, jute, kenaf, farm waste, cloth, pulp (unbleached soft wood kraft pulp (NUKP), bleached soft wood kraft pulp (NBKP), unbleached hard wood kraft pulp (LUKP), bleached hard wood kraft pulp (LBKP), unbleached soft wood sulfite pulp (NUSP), bleached soft wood sulfite pulp (NBSP), thermomechanical pulp (TMP), recycled pulp, waste paper and the like), animals (for example, *Ascidiacea*), algae, microorganisms (for example, acetic acid bacteria (*Acetobacter*)), and microbial products. Cellulose fibers derived from plants or microorganisms are preferable, and cellulose fibers derived from plants are more preferable.

The number average fiber diameter of the cellulose raw material is not particularly limited. In the case of soft wood kraft pulp as a common pulp, the thickness is about 30 to 60 µm, and in the case of hard wood kraft pulp, the thickness is about 10 to 30 µm. In the case of other pulps, those that have undergone general purification are about 50 µm. For example, in the case of a purified chip of several centimeters in size, it is preferable to be adjusted to the thickness of about 50 µm by performing mechanical treatment with a disintegrator such as a refiner and a beater.

[Chemical Modification]

An anionic group is introduced into the above-mentioned cellulose raw material to obtain an anionically-modified cellulose fiber. A method for introducing an anionic group is not particularly limited, but examples thereof include a method for introducing an anionic group into a pyranose ring of cellulose by oxidation or a substitution reaction. Specific examples include a reaction to oxidize a hydroxyl group of a pyranose ring into a carboxy group, and a reaction in which a carboxymethyl group, a phosphoric ester group, or an ester group of a phosphorous acid is introduced by a substitution reaction to the pyranose ring.

[Carboxymethylation]

As mentioned above, examples of the anion-modification include carboxymethylation. A carboxymethylated cellulose fiber as one example of the anionically-modified cellulose fiber may be obtained by carboxymethylating the above-mentioned cellulose raw material by well-known methods, or may be commercially available products. In any case, the degree of carboxymethyl substitution per anhydrous glucose unit of cellulose is 0.010 to 0.50, preferably 0.01 to 0.44, more preferably 0.02 to 0.40, and further preferably 0.10 to 0.30. Note here that when the degree of carboxymethyl substitution exceeds 0.50, dissolution in a medium such as water occurs, and the fibrous shape may not be maintained. The degree of carboxymethyl substitution of the carboxymethylated cellulose fiber is equivalent to the degree of carboxymethyl substitution of the carboxymethylated cellulose nanofiber.

The degree of carboxymethyl substitution of the carboxymethylated cellulose fiber can be measured by the following method. Firstly, about 2.0 g of carboxymethylated cellulose fiber (absolute dry) is weighed and placed in a 300 mL volume stoppered Erlenmeyer flask. Then, 100 mL of methanol nitrate (liquid obtained by adding 100 mL of high grade concentrated nitric acid to 1000 mL of methanol) is added, followed by shaking for 3 hours, and thus the carboxymethylated cellulose fiber in the form of salt (hereinafter, also referred to as "CM-cellulose fiber") is converted into acid-type CM-cellulose fiber. Then, 1.5-2.0 g of acid-type CM-cellulose fiber (absolute dry) is weighed and placed in a 300 mL volume stoppered Erlenmeyer flask. The acid type CM-cellulose fiber is wetted with 15 mL of 80% by mass methanol, and 100 mL of 0.1 N NaOH is added, followed by shaking at room temperature for three hours. Phenolphthalein as an indicator is used as an indicator to perform back titration of excessive NaOH with 0.1 N $H_2SO_4$. The degree of carboxymethyl substitution (DS) is calculated by the following formula.

$$A=[(100\times F'-(0.1N\ H2SO4)(mL)\times F)\times 0.1]/(\text{absolute dry mass of acid-type CM-cellulose fiber (g)})$$

$$DS=0.162\times A/(1-0.058\times A)$$

(wherein A is an amount of 1N NaOH (mL) that needs neutralization into 1 g of acid-type CM-cellulose fiber, F is a factor of 0.1 N $H_2SO_4$, and F' is a factor of 0.1 N NaOH).

Examples of methods for producing a carboxymethylated cellulose fiber include the following methods. In other words, firstly, 3 to 20 times by weight of water and/or a lower alcohol (for example, water, methanol, ethanol, N-propyl alcohol, isopropyl alcohol, N-butyl alcohol, isobutyl alcohol, tertiary butyl alcohol) is added to the cellulose raw material as a solvent; alone or as a mixed medium of two or more types. When the lower alcohol is mixed with the solvent, the mixing ratio of the lower alcohol is preferably 60 to 95% by mass. Herein, as a mercerizing agent, 0.5 to 20 times the amount of an alkali metal hydroxide (for example, sodium hydroxide, and potassium hydroxide) per anhydrous glucose residue of the cellulose raw material on a molar basis is added. A cellulose raw material, a solvent, and a mercerizing agent are mixed and mercerized at a reaction temperature of 0 to 70° C. (preferably at 10 to 60° C.) and a reaction time of 15 minutes to 8 hours (preferably, 30 minutes to 7 hours). Thereafter, a carboxymethylating agent (for example, monochloroacetic acid or its salts) is added 0.05 to 10.0 times per glucose residue in terms of moles, and the etherification reaction is carried out at a reaction temperature of 30 to 90° C. (preferably, at 40 to 80° C.) and a reaction time of 30 minutes to 10 hours (preferably, 1 to 4 hours).

"Carboxymethylated cellulose fiber", which is a kind of anionically-modified cellulose used for preparing anion-modified CNF, is a cellulose that maintains at least a part of the fibrous shape even when dispersed in water. Therefore, it is distinguished from carboxymethylcellulose as a kind of water-soluble polymer. When an aqueous dispersion of "carboxymethylated cellulose fiber" is observed under an electron microscope, a fibrous substance can be observed. On the other hand, even when an aqueous dispersion of carboxymethyl cellulose, which is a kind of water-soluble polymer, is observed, no fibrous substance is observed. The peak of the cellulose type I crystal can be observed when the "carboxymethylated cellulose fiber" is measured by X-ray diffraction, but the peak of the cellulose type I crystal is not observed in the carboxymethylcellulose as the water-soluble polymer.

[Carboxylation (Oxidation)]

One example of the anion-modification includes carboxylation (also referred to as oxidation). The carboxylation is a reaction of oxidizing a hydroxyl group of a pyranose ring of cellulose and converting it into a carboxy group (—COOH (acid type) or —COOM (metal salt type) (M is a metal ion)). In this specification, an anionically-modified cellulose fiber obtained by carboxylation is also referred to as a carboxylated cellulose fiber or an oxidized cellulose fiber. The carboxylated cellulose fiber can be obtained by carboxylating (oxidizing) the above cellulose raw material by a well-known method.

An amount of a carboxy group in the carboxylated cellulose fiber is not particularly limited, but the amount is adjusted to preferably 0.6 to 3.0 mmol/g and more preferably 1.0 to 2.0 mmol/g with respect to the absolute dry mass of the carboxylated cellulose fiber. The amount of the carboxy group can be adjusted by controlling types or amount of the oxidizing agent, and temperature and time in the oxidation reaction. The amount of the carboxy group of the carboxylated cellulose fiber is the same value as that of the amount of the carboxy group of the carboxylated cellulose nanofiber.

The amount of the carboxy group of the carboxylated cellulose fiber can be measured by the following method. In other words, firstly, 60 ml of 0.5% by mass slurry (medium: water) of the carboxylated cellulose fiber is prepared, and 0.1 M hydrochloric acid aqueous solution is added thereto to make the pH to 2.5. While 0.05 N of aqueous sodium hydroxide solution is added dropwise, the electric conductivity is measured until the pH becomes 11 to determine the amount (a) of sodium hydroxide consumed in the neutralization step of weak acid in which electric conductivity changes mildly. The determined amount (a) is used to calculate the amount of the carboxy group of the carboxylated cellulose fiber from the following formula:

Amount of carboxy group [mmol/g carboxylated cellulose fiber]=$a$ [ml]×0.05/mass of carboxylated cellulose fiber [g]

Examples of the carboxylation (oxidation) method include a method of oxidizing a cellulose raw material in water using an oxidizing agent in the presence of an N-oxyl compound and a compound selected from the group consisting of bromide, iodide, and mixtures thereof. By this oxidation reaction, a primary hydroxyl group at the C6 position of a glucopyranose ring on the cellulose surface is selectively oxidized, a cellulose fiber having an aldehyde group and a carboxy group (—COOH) or a carboxylate group (—COO—) on the surface can be obtained. The concentration of the cellulose raw material in water at the time of the reaction is not particularly limited, but is preferably 5% by mass or less.

An N-oxyl compound is a compound capable of generating nitroxyl radicals. Any compounds can be used as the N-oxyl compound as long as they promote the desired oxidation reaction. Examples include 2,2,6,6-tetramethylpiperidine-1-oxy radical (TEMPO) and derivatives thereof (for example, 4-hydroxy TEMPO). The use amount of the N-oxyl compound is not particularly limited as long as it is a catalytic amount capable of oxidizing the cellulose raw material. For example, 0.01 to 10 mmol is preferable, 0.01 to 1 mmol is more preferable, and 0.05 to 0.5 mmol is more preferable with respect to 1 g of absolutely dried raw cellulose material. Furthermore, about 0.1 to 4 mmol/L is preferable with respect to the entire reaction solution.

Bromide is a compound including bromine, and examples thereof include alkali metal bromide that can be dissociated and ionized in water. Iodide is a compound including iodine, and examples thereof include alkali metal iodide. The amount of bromide or iodide to be used can be selected in a range in which the oxidation reaction can be promoted. The amount of bromide and iodide is, for example, preferably 0.1 to 100 mmol, more preferably 0.1 to 10 mmol, and further preferably 0.5 to 5 mmol with respect to 1 g of absolutely dried cellulose raw material.

As the oxidizing agent, a well-known agent can be used, and, for example, halogen, hypohalite acid, halite acid, perhalogen acid or their salts, halogen oxide and peroxide can be used. Among them, sodium hypochlorite which is inexpensive and has little environmental load, is preferable. Appropriate use amount of the oxidizing agent is, for example, preferably 0.5 to 500 mmol, more preferably 0.5 to 50 mmol, further preferably 1 to 25 mmol, and further more preferably 3 to 10 mmol with respect to 1 g of absolutely dried cellulose raw material. Furthermore, for example, the amount is preferably 1 to 40 mol with respect to 1 mol of N-oxyl compound.

The oxidation of the cellulose raw material is likely to proceed efficiently even under relatively mild conditions. Therefore, the reaction temperature may be 4 to 40° C. or a room temperature of about 15 to 30° C. As the reaction proceeds, because a carboxy group is formed in the cellulose chain, the pH of the reaction solution is decreased. In order to efficiently proceed the oxidation reaction, it is preferable to maintain the pH of the reaction solution at about 8 to 12, and preferably about 10 to 11, by adding an alkaline solution such as an aqueous sodium hydroxide solution. The medium for the reaction solution is preferably water because of ease in handling and the fact that side reactions rarely occur. The reaction time in the oxidation reaction can be set appropriately according to the progress of oxidation, and is usually about 0.5 to 6 hours, for example, about 0.5 to 4 hours.

The oxidation reaction may be carried out in two stages. For example, by oxidizing the oxidized cellulose fiber obtained by filtering again after the completion of the reaction in the first stage under the same or different reaction conditions, the reaction is not inhibited by salt produced as a by-product in the reaction of the first stage, and the oxidation can proceed efficiently.

Other examples of the method of carboxylation (oxidation) include an oxidizing method by bringing a gas including ozone into contact with a cellulose raw material. By this oxidation reaction, hydroxyl groups at least 2 and 6 positions of the glucopyranose ring are oxidized to carboxy groups, and decomposition of the cellulose chain occurs. The ozone concentration in the air including ozone is preferably 50 to 250 g/m$^3$, and more preferably 50 to 220 g/m$^3$. The amount of ozone added to the cellulose raw material is preferably 0.1 to 30 parts by mass and more preferably 5 to 30 parts by mass when the solid content of the cellulose raw material is 100 parts by mass. The ozone treatment temperature is preferably 0 to 50° C., and more preferably 20 to 50° C. The ozone treatment time is not particularly limited, but the time is about 1 minute to 360 minutes, and preferably 30 to 360 minutes. When the ozone treatment conditions are within these ranges, it is possible to prevent cellulose from excessively being oxidized and decomposed, and the yield of the oxidized cellulose fibers is improved.

After the ozone treatment, additional oxidation treatment may be performed using an oxidizing agent. Oxidizing agents to be used for the additional oxidation treatment are not particularly limited, but examples thereof include chlorine-based compounds such as chlorine dioxide and sodium chlorite, oxygen, hydrogen peroxide, persulfuric acid, and peracetic acid. For example, the oxidizing agent is dissolved in a polar organic solvent such as water or alcohol to prepare an oxidizing agent solution, and the cellulose raw material is immersed in the solution to perform additional oxidation treatment.

[Esterification]

An example of the anionic modification is esterification. An example of esterification is introduction of a phosphoric acid group or a phosphorous acid group into a cellulose raw material. In this specification, an anionically-modified cellulose fiber obtained by introduction of a phosphoric acid group is called "phosphate-esterified cellulose fiber", and an anionically-modified cellulose fiber obtained by introduction of a phosphorous acid group is called "phosphite-esterified cellulose fiber", and both are collectively called "esterified cellulose fiber".

Examples of the method for producing the phosphoric esterified cellulose fiber include a method for mixing a powder or an aqueous solution of a compound having a phosphoric acid group with a cellulose raw material or its slurry. Examples of the compound having a phosphate group include phosphoric acid, sodium dihydrogen phosphate, disodium hydrogen phosphate, trisodium phosphate, sodium pyrophosphate, sodium metaphosphate, potassium dihydrogen phosphate, dipotassium hydrogen phosphate, tripotassium phosphate, potassium pyrophosphate, potassium metaphosphate, ammonium dihydrogen phosphate, diammonium hydrogen phosphate, triammonium phosphate, ammonium pyrophosphate, ammonium metaphosphate, or the like. These may be used alone or in a mixture of two or more kinds.

The additive rate of the compound having a phosphoric acid group with respect to the cellulose raw material is preferably 0.1 to 500 parts by mass, more preferably 1 to 400 parts by mass, and further preferably 2 to 200 parts by mass with respect to 100 parts by mass of solid content of cellulose raw material in conversion of a phosphorus element. The reaction temperature is preferably 0 to 95° C., and more preferably 30 to 90° C. The reaction time is not particularly limited, but it is about 1 to 600 minutes, and more preferably 30 to 480 minutes. The resulting suspension of phosphoric esterified cellulose fibers is preferably dehydrated and then heat-treated at 100 to 170° C. from the viewpoint of suppressing hydrolysis of cellulose. The degree of substitution of the phosphate group per glucose unit of the phosphate-esterified cellulose fiber is preferably 0.001 or more and less than 0.40.

Examples of a method for producing the phosphite esterified cellulose fiber include a method of adding an alkali metal ion-containing substance and an additive (A) including at least any one of phosphite and metal phosphite salts (preferably, sodium hydrogen phosphite) to a cellulose raw material or its slurry, heating the resulting product, and introducing an ester group of phosphorous acid including a cation of an inorganic substance into a cellulose fiber. Note here that it is more preferable that an additive (B) including at least any one of urea or a urea derivative is added, heated, and an ester group and a carbamate group of phosphorous acid including a cation of an inorganic substance is introduced into the cellulose fiber. As the alkali metal ion-containing material, for example, hydroxides, metal sulfates, metal nitrates, metal chlorides, metal phosphates, metal phosphites, and metal carbonates can be used. However, metal phosphites also serving as the additive (A) is preferable, and sodium hydrogen phosphite is more preferable.

The additive (A) includes at least any one of phosphorous acids and metal phosphite salts. Examples of the additive (A) include phosphorous acid compounds such as phosphorous acid, sodium hydrogen phosphite, ammonium hydrogen phosphite, potassium hydrogen phosphite, sodium dihydrogen phosphite, sodium phosphite, lithium phosphite, potassium phosphite, magnesium phosphite, calcium phosphite, triethyl phosphite, triphenyl phosphite, and pyrophosphate. These phosphites or metal phosphites can be used alone or in combination. However, sodium hydrogen phosphite also serving as an alkali metal ion-containing substance is preferable. The addition amount of the additive (A) is preferably 1 to 10000 g, more preferably 100 to 5,000 g, and further preferably 300 to 1500 g with respect to 1 kg of cellulose raw material.

The additive (B) includes at least any one of urea and a urea derivative. Examples of the additive (B) include urea, thiourea, biuret, phenylurea, benzylurea, dimethylurea, diethylurea, and tetramethylurea. The urea or urea derivatives can be used alone or in combination. However, urea is preferably used. The addition amount of the additive (B) is preferably 0.01 to 100 mol, more preferably 0.2 to 20 mol, and further preferably 0.5 to 10 mol with respect to 1 mol of the additive (A).

The reaction temperature is preferably 100 to 200° C., and more preferably 100 to 180° C. The reaction time is not particularly limited, but the time is about 10 to 180 minutes, and more preferably 30 to 120 minutes. It is preferable that the cellulose fiber into which the ester group of phosphorous acid or the like is introduced is washed prior to disintegration. The degree of substitution of the phosphite group per glucose unit of the phosphite esterified cellulose fiber is preferably 0.01 or more and less than 0.23.

[Disintegration]

The device used in disintegrating anionically-modified cellulose fiber is not particularly limited, but the device preferably applies a strong shear force on the dispersion body of anionically-modified cellulose fiber, such as a high-speed rotation type, a colloid mill type, a high-pressure type, a roll mill type, or an ultrasonic type device. For efficient disintegration, it is preferable to use a wet type high-pressure or an ultrahigh-pressure homogenizer that can apply a pressure of 50 MPa or higher as well as apply a strong shear force to the dispersion of anionically-modified cellulose fiber. The pressure is preferably 100 MPa or higher, and even more preferably 140 MPa or higher. The number of treatments (passes) by a disintegrating apparatus may be once or twice or more, and preferably twice or more.

In the dispersion treatment, anionically-modified cellulose fibers are usually dispersed in a solvent. The solvent is not particularly limited as long as it can disperse anionically-modified cellulose fibers, and examples thereof include water, an organic solvent (for example, a hydrophilic organic solvent such as methanol), and a mixed solvent thereof. Since the anionically-modified cellulose fibers are hydrophilic, the solvent is preferably water.

The solid content concentration of the anionically-modified cellulose fiber in a dispersion is usually 0.1% by weight or more, preferably 0.2% by weight or more, and further preferably 0.3% by weight or more. This is efficient because the amount of liquid becomes appropriate with respect to the amount of anionically-modified cellulose fibers. The upper limit is usually 10% by weight or less, and preferably 6% by weight or less. Thus, fluidity can be maintained.

It is also possible to pre-treat the anionically-modified cellulose fibers, if necessary, prior to the disintegration and dispersion treatment with a high-pressure homogenizer. The pretreatment may be performed using devices for mixing, stirring, emulsifying, or dispersing, such as a high-speed shear mixer.

The anionically-modified cellulose fiber may be in the state of a water dispersion body obtained after production, or may undergo post-treatment if necessary. Examples of the post-treatment include drying (for example, a freeze-drying method, a spray-drying method, a shelf-type drying method, a drum drying method, a belt drying method, a drying method including thinly extending on a glass plate or the like, a fluid-bed drying method, a microwave drying method, or a drying method including using a heat generating fan under reduced pressure), re-dispersion in water (dispersing device is not limited), pulverization (for example, pulverization using equipment such as a cutter mill, a hammer mill, a pin mill, and a jet mill), but the method is not particularly limited to the above.

The power storage material according to the present invention is preferably in the form of a thin film having a sheet thickness of 100 μm or less and preferably 50 μm or less in expectation of a weight reduction effect. In this case, since static electricity attaches and detaches on the surface, power density and energy density can be increased by forming a thin film.

The power storage material according to the present invention has electric resistance of preferably 100 MΩ or more, and more preferably 100 GΩ or more, and has electric capacity of preferably 5 mF/cm$^2$ or more. Furthermore, it is preferable that long-term discharge of 1 day or more is possible by large-capacity storage, and instantaneous or short-time storage for 1 ms to 1 minute. Furthermore, it is preferable that rapid response charging/discharging of 1 MHz to 100 kHz, and preferably 0.1 to 100 Hz is possible. It is considered that the power storage material according to the present invention can store the current from the generator every 50/1000 to 60/1000 seconds by converting the alternating current of 50 Hz and 60 Hz into direct current using an AC/DC converter. As a result, solid-state power storage bodies can be transported by discontinuing power transmission lines, and can be freely transported domestically and internationally not only by automobiles but also by ships, airplanes, and the like.

In the power storage material according to the present invention, in order to increase the quantum size effect, a specific surface area of the fiber is preferably 10 $m^2/g$ or more, more preferably 100 $m^2/g$ or more, and further preferably 300 $m^2/g$ or more. Thus, the power storage material according to the present invention can store power instantaneously or in a relatively short time, and can store a large capacity of power. Note here that in general, a capacitor having a larger specific surface area as compared with conventional capacitors and formed of a storage system including an electric double layer is referred to as a super capacitor, and furthermore, a capacitor having storage capacity larger by 3 orders of magnitude or more is referred to as an ultra capacitor.

The specific surface area of fibers such as cellulose fibers used in the power storage material according to the present invention can be measured by a method according to the following procedures (1) to (9) with reference to a nitrogen gas adsorption method (JIS Z 8830).

(1) About 3% slurry of cellulose fibers (dispersion medium: water) is separately placed in a centrifuge container so that the solid content is about 0.1 g, and 100 ml of ethanol is added.

(2) The resulting product is stirred at 3000 rpm for 30 minutes in the container, using a Homo Disper Model 2.5 (manufactured by Primix Corporation).

(3) After stirring, cellulose fibers are precipitated in a centrifuging device under the conditions of 7000 G, 30 minutes and 30° C.

(4) The supernatant is removed so as not to remove the precipitated cellulose fibers as much as possible.

(5) After the supernatant is removed, 100 ml of ethanol is added, and further, stirring under the condition (2), centrifugation under the condition (3), and removal of the supernatant under the condition (4) are repeated three times.

(6) The solvent of (5) is changed from ethanol to t-butanol, and stirring, centrifugation, and removal of the supernatant are repeated three times in the same manner as in (5) at room temperature that is equal to or higher than the melting point of t-butanol.

(7) After the final supernatant is removed, 30 ml of t-butanol is added, the resulting product is mixed gently, then transferred to a conical tube, and allowed to freeze using liquid nitrogen.

(8) The conical tube is attached to a freeze-dryer and freeze-dried for 3 days.

(9) Thereafter, BET measurement is carried out (pretreatment conditions: 105° C., under a nitrogen stream for 2 hours, relative pressure: 0.01 to 0.30, sample amount: about 30 mg).

The ultra power storage body according to the present invention has the power storage material according to the present invention. It is preferable that the ultra power storage body according to the present invention includes the power storage material in the form of a thin film sheet, and has a power storage body having a pair of metal electrodes provided on both sides of the power storage material so as to sandwich the power storage material. In this case, it is equivalent to an electric distribution constant capacitor having a plurality of minute capacitors perpendicular to metal electrodes corresponding to the number of recesses and protrusions. In other words, the minute recesses and protrusions themselves have high electrical resistance, and can be represented by a parallel equivalent circuit of C and R. Furthermore, the ultra power storage body according to the present invention can be produced by forming upper and lower conductive electrodes made of Al, Cu, gold, polyacetylene, and the like, by a sputtering method or a casting method using a microelectromechanical system (MEMS or NEMS). At that time, it is preferable that each conductive electrode is applied on a protrusion surface along the surface shape of the power storage portion. Further, it is preferable that the ultra power storage body according to the present invention can operate at −269° C. to 300° C.

The ultra power storage body according to the present invention may include a stacked body in which a plurality of the power storage bodies is stacked. In this case, for example, it can be stacked in parallel by various MEMS methods, and a solid quantum direct storage body in which each parallel equivalent circuit is coupled in terms of electrical distribution constant can be obtained. Furthermore, the ultra power storage body according to the present invention may include a parallel integrated body in which a plurality of the power storage materials is arranged along the inner side surface of each metal electrode between the metal electrodes. In this case, a withstand voltage of 1 GV/m or more can be obtained.

The ultra power storage body according to the present invention can be used, for example, as an AC capacitor for a microelectronic circuit or a storage body on the back surface of a solar cell panel. It can also be used for various backup power supply modules, electronic/electrical boards for coupling elements, noise filters, high-sensitivity acceleration sensors, high-power transformer cutoff prevention devices, emergency power supply devices for automobiles or ships, and the like. It is also expected to be a direct current power storage material from sunlight in space in the future.

The physical storage body conditions for using a solid as a storage body has the following five conditions.

(1) The surface has recesses and protrusions of 20 nm or less in order to produce a quantum size effect.

(2) The substance has a high work function (electron adsorption ability).

(3) The structure has a locally positive charge.

(4) The electric circuit on the surface is an electric distributed constant circuit (parallel connection) (stacking effect of electric charge amount).

(5) The electric resistance is high; 100 MΩ or more, so as not to cause electric leakage of the stored charge.

The power storage material and the ultra power storage body according to the present invention can satisfy all of these five conditions, and has excellent performance as a solid quantum power storage material and a quantum storage body.

The present invention can provide a power storage material being capable of storing electricity in direct current and alternating current and being made by using a fiber material of cellulose molecules obtained from wood, plant fibers (pulp) or the like, and an ultra power storage body.

DESCRIPTION OF EMBODIMENTS

Hereinafter, a power storage material and an ultra power storage body in accordance with the embodiment of the present invention will be described based on drawings and Examples.

Figure 1:
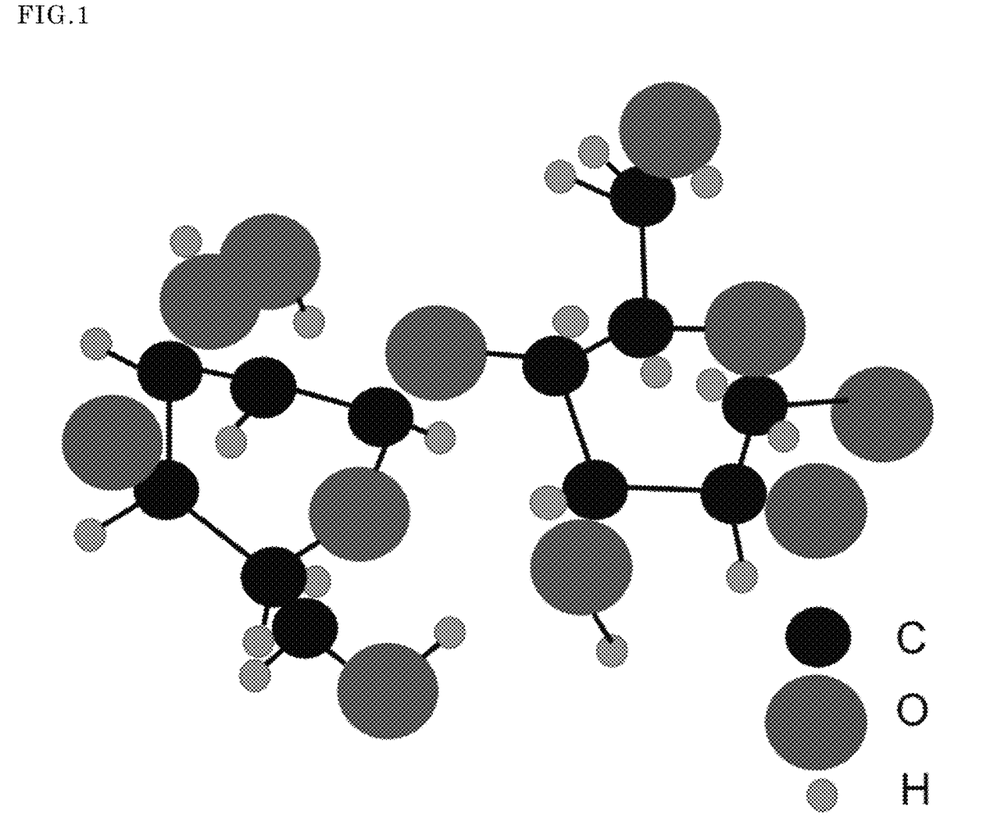
FIG. 1 is a perspective view showing a molecular structure of a power storage material in accordance with an embodiment of the present invention.

As shown in FIG. 1, the power storage material in accordance with the embodiment of the present invention the embodiment of the present invention is a sheet material having innumerable recess and protrusion surfaces including crystallized/amorphous fibers mainly including wood fibers (pulp).

Figure 2:
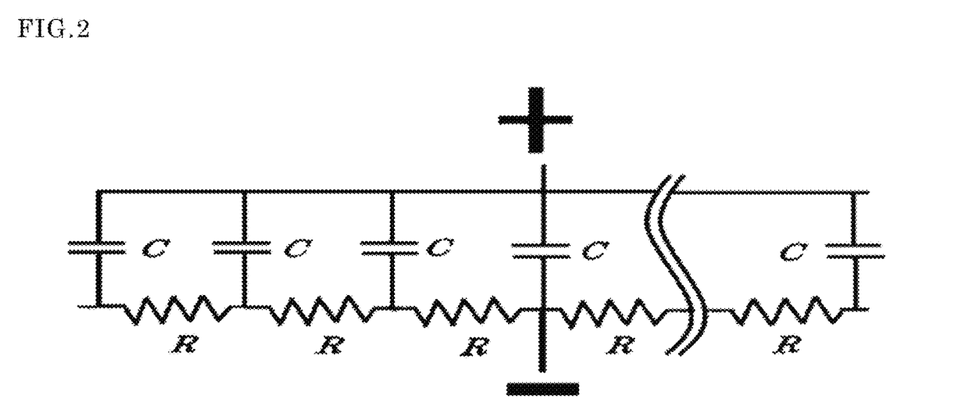
FIG. 2 is a circuit diagram of an electric distributed constant circuit, showing the power storage material in accordance with the embodiment of the present invention.

The power storage material in accordance with the embodiment of the present invention can store and discharge electricity by utilizing the electron adsorption phenomenon due to the quantum size effect that occurs in the protrusions of a large number of recesses and protrusions. The power storage material in accordance with the embodiment of the present invention is a capacitor in which innumerable recess and protrusion surfaces are each including a solid/gas electric double layer. As shown in FIG. 2, a plurality of capacitors is finitely joined in parallel to form an electric distributed constant circuit. Thus, the power storage material according to the embodiment of the present invention can store electricity instantaneously or in a relatively short time, and can store a large amount of electricity.

The following shows Examples of the power storage material and the ultra power storage body in accordance with the embodiment of the present invention. Note here that the following Examples are provided merely for describing the present invention and for reference in specific embodiments thereof, but not for limiting the scope of the present invention.

Example 1

The power storage material in accordance with the embodiment of the present invention was produced. Table 1 shows the producing method, processing method, manufacturing conditions, density of the produced ultra capacitor material, electric resistance (GΩ), and storage capacity (F/cm$^2$) of the manufactured samples 1 to 4 of the power storage material. The amount of electricity stored was determined from the discharge curve at a constant current of 1 nA after charging at 1 mA for 4 minutes (see, for example, FIG. 4), and the electrical resistance was determined from the Nyquist diagram (see, for example, FIG. 6). Each sample 1 to 4 was produced as follows.

Sample 1

A bleached unbeaten softwood kraft pulp (degree of whiteness: 85%) in an amount of 500 g (absolute dry weight) was added to 500 mL of an aqueous solution that dissolves 780 mg of TEMPO (Sigma Aldrich) and 75.5 g of sodium bromide, and the mixture was stirred until the pulp was dispersed uniformly. A sodium hypochlorous acid solution was added to the reaction system to an amount of 6.0 mmol/g, and oxidation reaction was started. The pH in the system decreased during the reaction, but a 3M sodium hydroxide solution was gradually added to adjust the pH to 10. The reaction was ended when the sodium hypochlorous acid was consumed and the pH in the system stopped changing. Pulp was separated from the reacted mixture by filtering with a glass filter, and the pulp was fully washed with water to obtain an oxidized pulp (hereinafter referred to as "TEMPO-oxidized pulp"). The pulp yield at this time was 90%, and the time required for oxidation reaction was 90 minutes. Furthermore, a specific surface area of the obtained TEMPO-oxidized pulp was 53 m$^2$/g.

The TEMPO-oxidized pulp obtained in the above step was adjusted to 3.0% (w/v) with water, and subjected to disintegration treatment five times using an ultra high-pressure homogenizer (20° C., 150 MPa) to obtain a dispersion liquid of the TEMPO-oxidized fine cellulose fibers (hereinafter, referred to as "TEMPO-oxidized CNF"). The obtained TEMPO-oxidized CNF had an average fiber diameter of 4 nm and an aspect ratio of 150. The amount of carboxyl groups in the obtained TEMPO-oxidized CNF was 1.42 mmol/g. The specific surface area of the obtained TEMPO-oxidized CNF was 386 m$^2$/g.

Ion-exchanged water was added to 3% (w/v) dispersion liquid of the obtained TEMPO-oxidized CNF, and the resulting product was stirred with a homogenizer at 3000 rpm for 10 minutes to dilute the concentration to 0.5% (w/v). The dispersion liquid was depressurized with an aspirator, the dispersion liquid was degassed, and further degassed with Mazerustar KK-300SS (manufactured by Kurabo Industries Ltd.) at 2000 rpm for 2 minutes. Then, a silicon rubber mold (100 cm$^2$) was placed on a hydrophilically treated polyethylene terephthalate film, 140 g of the dispersion liquid was poured into the film, and the film was dried at 40° C. for 48 hours to obtain a TEMPO-oxidized CNF sheet.

Sample 2

A TEMPO-oxidized CNF sheet was obtained in the same manner as in the sample 1 except that 3% (w/v) dispersion liquid in which the TEMPO-oxidized CNF produced in the same manner as in the sample 1 was dispersed was pressurized to 350° in an autoclave, treated at a constant pressure of 25 MPa, ion-exchanged water was then added thereto, the resulting product was stirred at 3000 rpm for 10 minutes by using a homogenizer, and the concentration was diluted to 0.5% (w/v).

Sample 3

Ion-exchanged water was added to the TEMPO-oxidized pulp obtained in the same manner as in the sample 1, and 20 g of the dispersion liquid adjusted to the concentration of 0.5% (w/v) was extracted by suction filtration through a 90 cm² nylon mesh with an opening size of 63 and then dried at 40° C. for 48 hours to produce a TEMPO-oxidized pulp sheet.

Sample 4

To a biaxial kneader in which the rotation speed was adjusted to 150 rpm, 130 parts of water and a mixture obtained by dissolving 20 parts of sodium hydroxide in a mixed solvent of 10 parts of water and 90 parts of isopropanol (IPA) were added, and 100 parts of hardwood pulp (LBKP manufactured by Nippon Paper Industries Co., Ltd.) was charged in a dry mass at 100° C. for 60 minutes. The resulting product was stirred and mixed at 35° C. for 80 minutes, and subjected to mercerization treatment. While further stirring was carried out, a mixed solvent including 23 parts of water, 207 parts of IPA, and 40 parts of sodium monochloroacetate were added. Then, the resulting product was stirred for 30 minutes, the temperature was raised to 70° C. and etherification treatment was carried out for 90 minutes. After the reaction was completed, the resulting product was neutralized with acetic acid until the pH became 7, the resulting product was washed with hydrous methanol, and then deliquored, dried, and pulverized to obtain a sodium salt of the CM-pulp. The degree of substitution of carboxymethyl ether in the obtained CM-pulp was 0.17.

The CM-pulp obtained in the above step was adjusted to 3.0% (w/v) with water, and subjected to disintegrating treatment five times with an ultra high-pressure homogenizer (20° C., 150 MPa) to obtain a dispersion liquid of the CM-fine cellulose fibers (hereinafter, referred to as "CM-CNF". The specific surface area of the obtained CM-CNF was 325 m²/g. Ion-exchanged water was added to the obtained 3.0% (w/v) dispersion liquid of the CM-CNF, and the resulting mixture was stirred with a homogenizer at 3000 rpm for 10 minutes to dilute to a concentration to 0.5% (w/v). The dispersion liquid was depressurized with an aspirator, the dispersion liquid was degassed, and further degassed with Mazerustar KK-300SS (Kurabo Industries Ltd.) at 2000 rpm for 2 minutes. Then, a silicon rubber mold (100 cm²) was placed on a hydrophilically treated polyethylene terephthalate film, 140 g of dispersion liquid was poured into the film, and the film was dried at 40° C. for 48 hours to obtain a CM-CNF sheet.

TABLE 1

| Test Sample | Sample type | Treatment method | Crystal or amorphous | Density (g/cm³) | Electric resistance (GΩ) | Storage amount (mF/cm²) |
|---|---|---|---|---|---|---|
| 1 | Oxide CNF sheet | | Crystal | 1.5 | 135 | 15.3 |
| 2 | Oxide CNF sheet | TEMPO catalytic oxidized material is heated to 320° C. under 25 MPa | | 1.7 | 127 | 18.5 |
| 3 | Oxide pulp sheet | | | 1.1 | 50 | 7.8 |
| 4 | Carboxymethylated CNF sheet | | | 1.0 | 86 | 3.5 |

As shown in Table 1, it was revealed that each of the power storage materials of the samples 1 to 4 had electric resistance of 50 GΩ to 135 GΩ and electric capacity of 3 F/cm$^2$ to 19 F/cm$^2$. In particular, since the sample 2 is amorphous, and have atomic vacancies, and when they have a positive charge, the amount of electron adsorbed increases and the amount of stored electricity increases. It was also revealed that the specific density was as low as 2 or less. It was also revealed that each of the power storage materials of the samples 1 to 4 can operate up to −269° C. to 300° C. and 500 V. In addition, withstand voltage up to 1000 V was also revealed. From these facts, it is considered that each of the power storage materials is the most suitable material for the field of heavy electricity and the atmospheric current (lightning current) storage. Furthermore, when the sample 2 was irradiated with a strong electron beam of 3 mA/m$^2$, it was revealed that the sample 2 had withstand voltage up to 200 keV, which was twice as high as that of the carbon nanotube of 80 keV.

Figure 3:
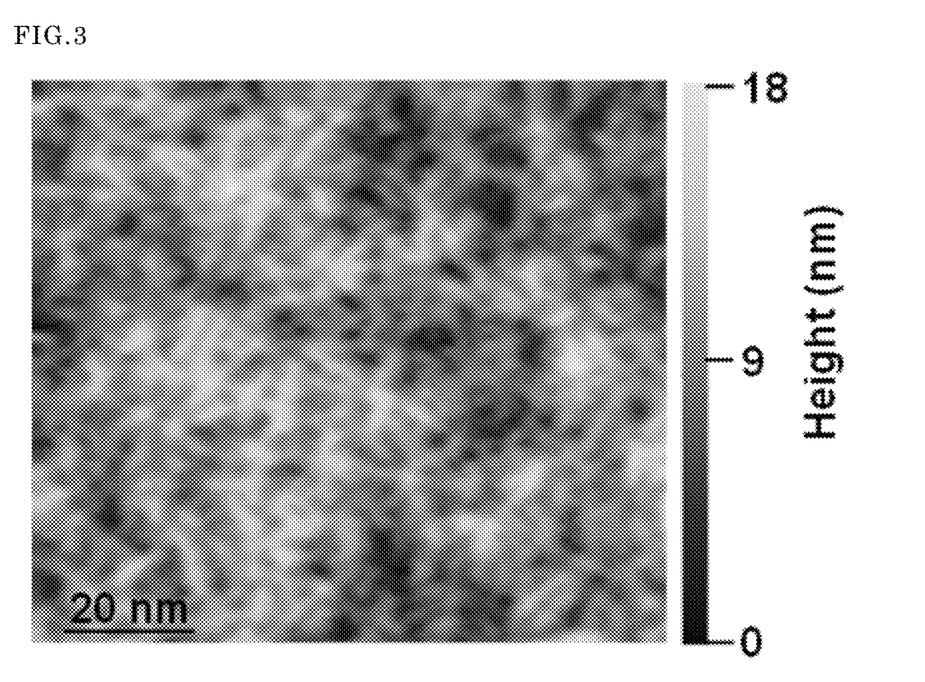
FIG. 3 is an atomic force microscope (AFM) image of a surface of a sample 1 of the power storage material in accordance with the embodiment of the present invention.
Figure 4:
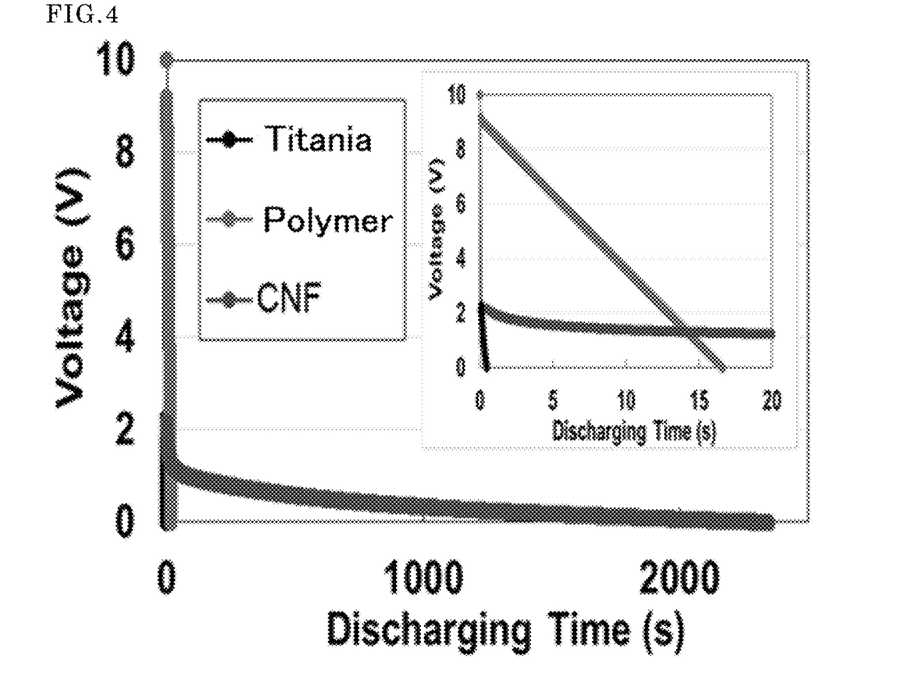
FIG. 4 is a graph showing discharge characteristics of the power storage material under a constant current of 1 nA after charging the sample 1 at 1 mA and 10 V in accordance with the embodiment of the present invention.

An atomic force microscope (AFM) image of a surface of the sample 1 is shown in FIG. 3. As shown in FIG. 3, it was revealed that the surface of the power storage material had a large number of recesses and protrusions having a diameter of 3 nm or less. Furthermore, the discharge characteristics of the sample 1 after being charged at 1 mA and 10 V under a constant current of 1 nA were measured, and the results are shown in FIG. 4. FIG. 4 also shows amorphous titania ("titania" in the figure) and an amorphous perfluoride polymer ("polymer" in the figure) as comparative examples. As shown in FIG. 4, it was revealed that the amorphous titania and the amorphous polymer had a discharging time of 10 seconds or less, whereas the sample 1 showed a discharging time (storage amount) of about 2370 seconds.

Example 2

Figure 5:
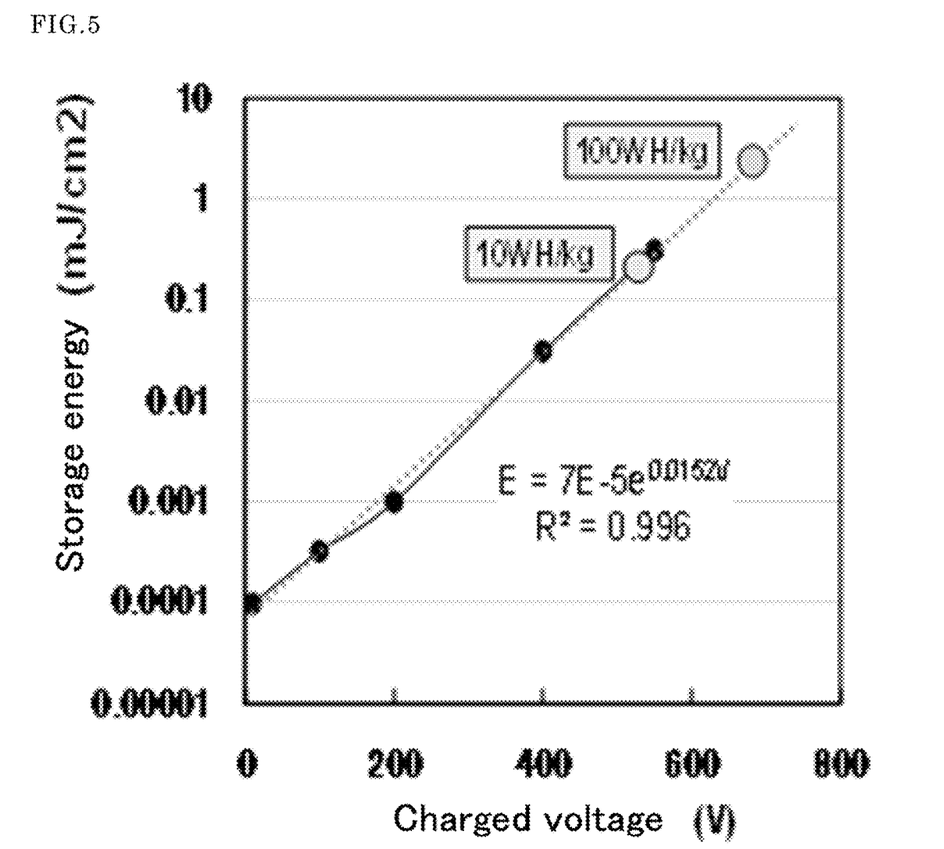
FIG. 5 is a graph showing a relationship between a charged voltage and storage energy at the time of charging a sample 2 of the power storage material in accordance with the embodiment of the present invention.

Charging was performed for 2 seconds by a constant voltage method using the power storage material of the sample 2, unlike the charging for several hours by constant current charging as in conventional Li-ion secondary batteries. The relationship between a charged voltage and storage energy at that time is measured and shown in FIG. 5. As shown in FIG. 5, it was revealed that the amount of stored electricity increased parabolically with an increase in the charging voltage in an extremely short time.

Example 3

Using the power storage material of sample 2, the storage capacity was measured by series bonding with alternating current. Copper electrodes were mechanically fixed above and below the thin film of the sample 2 having a surface area of 10 mm×30 mm, and the storage capacity was measured in the frequency range of 1 MHz to 1 MHz by a potentiostat/galvanostat. The measurement results are shown in FIG. 6.

Figure 6:
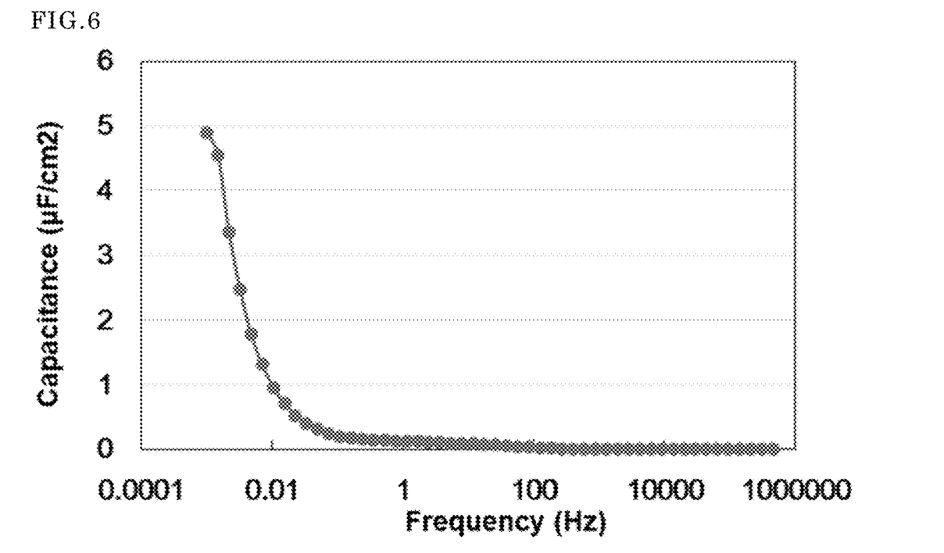
FIG. 6 is a graph showing the frequency characteristics of a storage capacitance Cp at a series junction of the sample 2 of the power storage material in accordance with the embodiment of the present invention.

As shown in FIG. 6, it was revealed that in the power storage material of the sample 2, power storage capacity increased logarithmically as the frequency decreased. This is because the power storage material of the embodiment of the present invention is charged and discharged at the nano-diameter fiber interface in the low frequency region, but is not charged and discharged at the fiber interface where the height difference is large in the high frequency region. A similar phenomenon of increasing electric capacity in the low frequency region is observed in amorphous titania (see, for example, Non-Patent Literature 10).

As described above, the power storage material in accordance with the embodiment of the present invention can be charged and discharged in a low frequency region by the quantum nano-size effect, and can be used as an AC capacitor for a microelectronic circuit, a noise filter, or the like.

Example 4

The frequency characteristics were measured using the power storage material of the sample 3. The measurement was carried out by mechanically fixing copper electrodes above and below the thin film of the sample 2 having a surface area of 10 mm×30 mm. A Nyquist diagram of AC impedance in the frequency range of 1 MHz to 1 GHz was measured, and the results are shown in FIG. 7.

Figure 7:
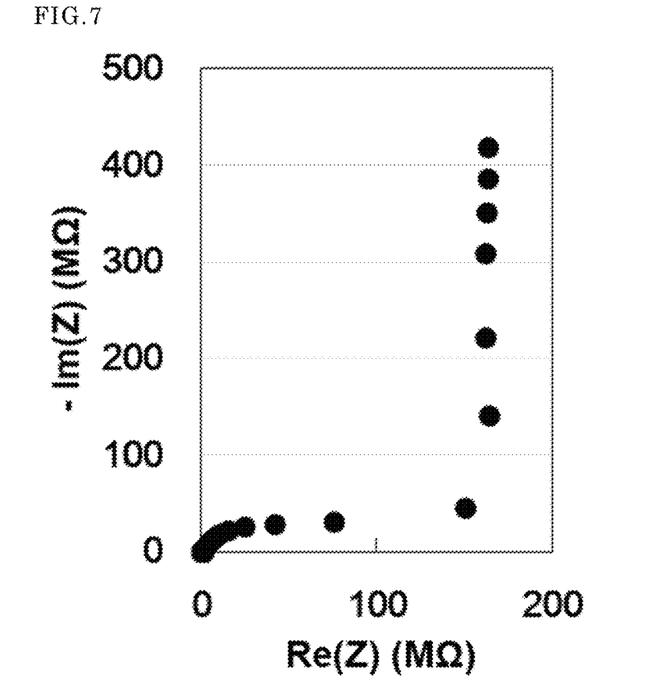
FIG. 7 is a Nyquist diagram (Cole-Cole plot) of AC impedance showing frequency characteristics of a sample 3 of the power storage material in accordance with the embodiment of the present invention.

As shown in FIG. 7, a Nyquist diagram parallel to the imaginary axis was obtained. Such AC impedance characteristics show a distributed constant circuit in which a large number of capacitors are connected in parallel to the resistor R, and show that it is one huge storage body by the electric distributed constant circuit shown in FIG. 2.

The characteristics of the power storage material in accordance with the embodiment of the present invention are shown in Table 2 in comparison with the characteristics of a commercially available Li-ion battery, an electric double layer capacitor, and a physical secondary battery (battenice) being developed. In Table 2, "O" indicates that the characteristics are relatively good, "X" indicates that the characteristics are relatively poor, and "Δ" indicates that the characteristics are average. As shown in Table 2, the power storage material in accordance with the embodiment of the present invention has superior characteristics to the Li-ion battery in terms of charging voltage, operating temperature, charging time, DC storage, ignition resistance, and environmental pollution, particularly superior characteristics to electric double layer capacitors in terms of charging voltage, operating temperature, ignition resistance, and environmental pollution, and is particularly superior to physical secondary batteries in charging voltage, operating temperature, and DC storage.

TABLE 2

|  | Specific gravity | Charge voltage | Operating temperature | Charging time | DC charge | Ignition resistance | Environmental pollution |
|---|---|---|---|---|---|---|---|
| Product of the present invention | O to 1.6 | O to 500 V | O −200 to +200° C. | O | O | O | O |
| Li-ion battery | O 3 to 3.5 | X 3 to 4.2 V | X −10 to +30° C. | X to 10 hr | X | X | X |

TABLE 2-continued

| | Specific gravity | Charge voltage | Operating temperature | Charging time | DC charge | Ignition resistance | Environmental pollution |
|---|---|---|---|---|---|---|---|
| Electric double layer capacitor | ○ to 2 | X 3 to 4 V | X −10 to +30° C. | ○ | ○ | Δ | Δ |
| Physical secondary battery (battenice) | ○ to 5 | X to 1.5 V | Δ −25 to +85° C. | ○ | Δ | ○ | ○ |

Example 5

Figure 8:
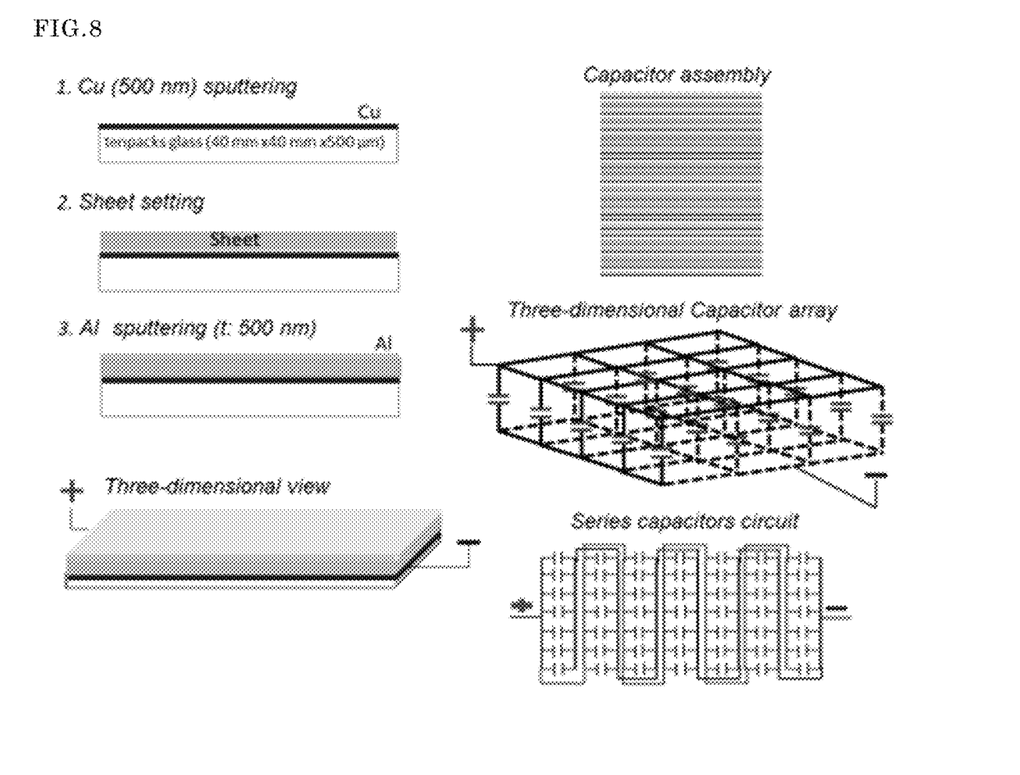
FIG. 8 is side views and a perspective view showing a method of manufacturing a stack by an MEMS method of an ultra power storage body in accordance with the embodiment of the present invention.

As shown in FIG. 8, a stacked power storage body was prepared by the MEMS method using the ultracapacitor material of the sample 2. Firstly, a Cu layer (thickness: 500 nm) was formed on a surface of a glass substrate (40×40×0.5 mm) by sputtering (see FIG. 8.1), and an Al layer was sputtered on the Cu layer (see FIG. 8.3). The glass substrate was removed, and it was used as the basic body of a storage layer for an electronic circuit. The Cu layer and the Al layer form a pair of metal electrodes. A plurality of these electrodes were stacked so as to prepare a power storage layer for an electronic circuit. In the produced stacked storage body, the storage layers for electronic circuits are joined in parallel in which the Al layer of the storage layer for electronic circuits at the top and the Cu layer of the storage layer for electronic circuits at the bottom serve as terminals. Therefore, for example, a stack in which 100 electronic circuit storage layers are stacked has capacity 100 times as much as that of a single electronic circuit storage layer.

The power storage body in accordance with the embodiment of the present invention can be used as, for example, an AC capacitor for a microelectronic circuit and a power storage body on the back surface of a solar cell panel. Furthermore, the power storage body can also be used in, for example, various backup power supply modules for lightning arresters, welding, and over-discharge prevention, and electrical and electronic boards of coupling elements, noise filters, high-sensitivity acceleration sensors, high-power transformer cutoff prevention devices, emergency power supply devices for automobiles or ships, and the like.

What is claimed is:

1. A power storage material comprising a crystallized fiber and an amorphous fiber mainly including a fiber derived from at least any one of wood, plant fibers or pulp, animals, algae, microorganisms, and microbial products, and having a large number of recesses and protrusions having a diameter of 1 nm to 500 nm on a surface,
   wherein the crystallized fiber and the amorphous fiber has a specific surface area of 100 m$^2$/g or more.

2. The power storage material according to claim 1, wherein the crystallized fiber and the amorphous fiber have an atomic vacancy.

3. The power storage material according to claim 1, wherein electric resistance is 100 MΩ or more, and an electric capacity is 5 mF/cm$^2$ or more.

4. An ultra power storage body comprising a power storage material according to claim 1.

5. The ultra power storage body according to claim 4, wherein the power storage material has a thin film sheet shape,
   the ultra power storage body comprising a pair of metal electrodes respectively provided on both sides of the power storage material to sandwich the power storage material.

6. The ultra power storage body according to claim 5, wherein the power storage body comprises a plurality of stacked bodies.

7. The power storage material according to claim 1, wherein the large number of recesses and protrusions have a diameter of 1 nm to 30 nm.

8. A power storage material comprising a crystallized fiber and an amorphous fiber mainly including a fiber derived from at least any one of wood, plant fibers or pulp, animals, algae, microorganisms, and microbial products, and having a large number of recesses and protrusions having a diameter of 1 nm to 30 nm on a surface.

9. The power storage material according to claim 8, wherein the crystallized fiber and the amorphous fiber have an atomic vacancy.

10. The power storage material according to claim 8, wherein electric resistance is 100 MΩ or more, and an electric capacity is 5 mF/cm$^2$ or more.

11. An ultra power storage body comprising a power storage material according to claim 8.

12. The ultra power storage body according to claim 11, wherein the power storage material has a thin film sheet shape,
   the ultra power storage body comprising a pair of metal electrodes respectively provided on both sides of the power storage material to sandwich the power storage material.

13. The ultra power storage body according to claim 12, wherein the power storage body comprises a plurality of stacked bodies.

* * * * *